(12) United States Patent  (10) Patent No.: US 9,344,195 B2
Diab  (45) Date of Patent: May 17, 2016

(54) MULTIPLE LEVEL SIGNALING FOR PASSIVE OPTICAL NETWORKS

(71) Applicant: BROADCOM CORPORATION, Irvine, CA (US)

(72) Inventor: Wael William Diab, San Francisco, CA (US)

(73) Assignee: BROADCOM CORPORATION, Irvine, CA (US)

( * ) Notice: Subject to any disclaimer, the term of this patent is extended or adjusted under 35 U.S.C. 154(b) by 277 days.

(21) Appl. No.: 13/898,626

(22) Filed: May 21, 2013

(65) Prior Publication Data

US 2014/0321863 A1    Oct. 30, 2014

Related U.S. Application Data

(60) Provisional application No. 61/817,405, filed on Apr. 30, 2013.

(51) Int. Cl.
*H04B 10/00* (2013.01)
*H04B 10/516* (2013.01)
*H04B 10/272* (2013.01)

(52) U.S. Cl.
CPC ............ *H04B 10/516* (2013.01); *H04B 10/272* (2013.01)

(58) Field of Classification Search
CPC ............ H04B 10/505; H04B 10/5051; H04B 10/516; H04B 10/272
See application file for complete search history.

(56) References Cited

U.S. PATENT DOCUMENTS

| | | | | |
|---|---|---|---|---|
| 5,559,624 | A * | 9/1996 | Darcie | H04B 10/071 398/167.5 |
| 7,532,135 | B1 | 5/2009 | Diab | |
| 2004/0001718 | A1 * | 1/2004 | Matthews | H04J 14/08 398/98 |
| 2004/0021829 | A1 * | 2/2004 | Griffin | H04B 10/505 353/30 |
| 2005/0047784 | A1 * | 3/2005 | Jung | H04B 10/2587 398/72 |
| 2006/0114811 | A1 * | 6/2006 | Ahmed et al. | 370/204 |
| 2008/0019523 | A1 * | 1/2008 | Fuse | H04L 9/088 380/256 |
| 2008/0317468 | A1 * | 12/2008 | Villarruel | H04J 14/0282 398/68 |
| 2009/0010650 | A1 * | 1/2009 | Tsuchiya | H04J 3/0602 398/59 |
| 2009/0175622 | A1 * | 7/2009 | Lee | H04J 14/0227 398/79 |
| 2010/0158530 | A1 * | 6/2010 | Soto et al. | 398/79 |
| 2010/0239247 | A1 * | 9/2010 | Kani | H04J 14/0227 398/41 |
| 2011/0142446 | A1 * | 6/2011 | Lyubomirsky | 398/43 |
| 2012/0045209 | A1 * | 2/2012 | Boyd et al. | 398/66 |
| 2014/0321863 | A1 * | 10/2014 | Diab | H04B 10/516 398/185 |

OTHER PUBLICATIONS

Diab et al., "Ethernet in the First Mile: Access for Everyone," Standards Information Network, IEEE Press, Apr. 1, 2006 http://www.amazon.com/Ethernet-First-Mile-Access-Everyone/dp/0738148385/ref=sr_1_1?s=books&ie=UTF8&qid=1375724245&sr=1-1&keywords=ethernet+in+the+first+mile.

* cited by examiner

*Primary Examiner* — Danny Leung
(74) *Attorney, Agent, or Firm* — Garlick & Markison; Randy Lacasse

(57) ABSTRACT

A technique in which an outgoing signal is encoded to have multiple signal levels to modulate a light source, in which respective signal levels are indicative of different signal states of more than one bit. The multi-level signal is transmitted on a passive optical network (PON) having passive splitters to split the modulated light to transmit the light having multiple signal levels to a plurality of destinations via the PON.

16 Claims, 9 Drawing Sheets

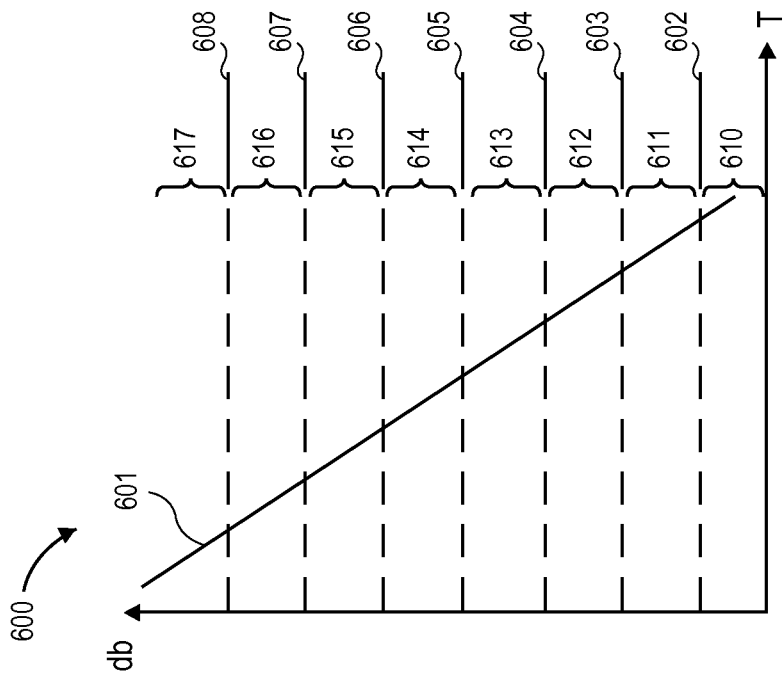
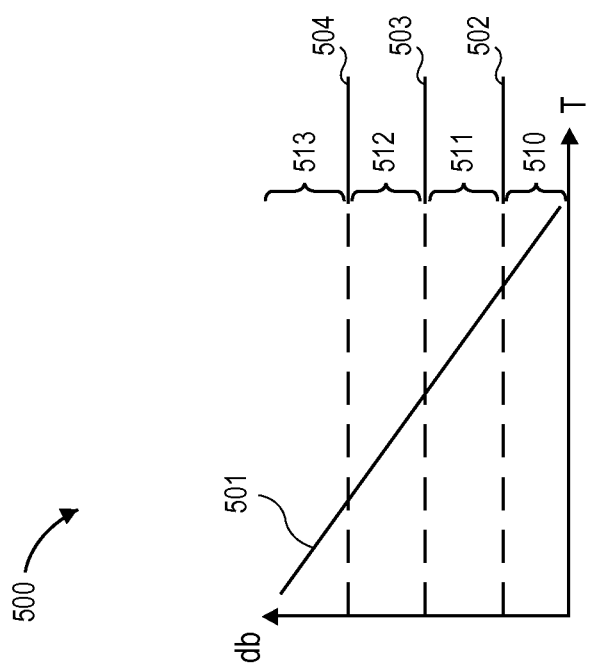

_US 9,344,195 B2_

MULTIPLE LEVEL SIGNALING FOR PASSIVE OPTICAL NETWORKS

CROSS REFERENCE TO RELATED APPLICATION

This application claims the benefit of priority under 35 U.S.C. 119(e) to U.S. Provisional Patent Application No. 61/817,405, filed Apr. 30, 2013, which is incorporated herein by reference in its entirety for all purposes.

BACKGROUND

1. Technical Field

The embodiments of the present disclosure relate to communications over an optical link and, more particularly, to multiple level signaling when communicating over a passive optical network.

2. Description of Related Art

Various wired communication systems are known today to provide communication links between devices, whether those devices are endpoint devices, intermediate routing devices or bridging devices. However, one of the limitations of wired systems is the amount of data such wired systems are capable of transferring. For example, wired links to homes and businesses may be capable of reaching bit transfer rates of 100 Mbits per second, but further increases on speed may require overly complex coding to transfer data at much higher data rates. Since the demand is continually increasing to transfer more data and at faster speeds, other mediums and techniques are being pursued to obtain the higher bandwidth.

One medium that is being pursued to obtain higher data transfer rates is optical medium, such as optical fibers. Although optical links exist today in providing the backbone infrastructure to cellular systems, optical fiber infrastructures have not yet been implemented in large scale to provide communication links in urban environments. With a few exceptions, most urban settings still rely on cable or telephone lines to transfer signals from a service provider for such services as television, Internet, video and movie downloads, etc., as well as uploading of subscriber information. These services are being taxed further as various functions are moved into the cloud environment.

An optical infrastructure is now being implemented in certain urban environments, but such systems suffer from the need to lay in a complete new infrastructure to businesses and residences. The equipment cost is also costly in that high intensity light sources, such as lasers and LEDs (Light Emitting Diodes) are needed at each end to provide the signal transmission. Thus, point-to-point systems are not desirable for such an infrastructure, since point-to-point systems typically require one-to-one connection between the two transmission ends. One way to achieve a reduction in light emitting sources and accompanying circuitry is to use Passive Optical Networks (PONs). In a typical PON structure, a service provider connects to multiple users or subscribers (businesses, homes, etc.) through a passive network where the light signal from the service provider is split by passive splitters. Thus, a service provider may use one light source to transmit to a number of end users. Instead of requiring 2N light source transceivers to have point-to-point communications between a service provider and N subscribers, a PON system may provide the connection with N+1 transceivers, since the service provider could provide the connection with one light source.

Current PON systems rely on data transmissions that are based on non-return-to-zero (NRZ) detection. That is, a first of a binary signal state of a bit (e.g. "1" state of a bit) is indicated by one signal state and a second of the binary signal state of the bit (e.g. "0" state of the bit) is indicated by a second signal state. NRZ coding does not rely on a rest state, such as a zero-crossing detection, for return-to-zero (RZ) coding. The NRZ technique provides for a two-state (0 or 1) serial transmission in which the state change of a bit is detected with the state change of the signal at the receiving end. Although the NRZ technique in PON systems still allows for 1 Gigabit (Gbit) per second data transfer rates and may also allow for 10 Gbit per second transfer rates, it may not be adequate for data transfer requirements in the future when higher data rates are anticipated.

BRIEF DESCRIPTION OF THE DRAWINGS

FIG. 5 is an example signal level diagram for a multi-level light transmission having four signal levels according to one example embodiment.

FIG. 6 is an example signal level diagram for a multi-level light transmission having eight signal levels according to one example embodiment.

DETAILED DESCRIPTION

The embodiments described below may be practiced in a variety of systems that utilize an optical link. Although the embodiments are described in reference to a Passive Optical Network, other optical links and networks may be used as well. Furthermore, in the description below, protocols or specifications defined under one of IEEE 802.3 standard or protocol (such as IEEE 802.3ah, IEEE 802.3ae, IEEE 802.3av, IEEE 802.3-2012, etc.) are described, as well as the Ethernet protocol, for purposes of understanding, however, other embodiments may use other protocols or standards. Additionally, in the description below, certain frequencies and data transfer rates are described, but the embodiments are not limited to these specific frequencies and data rates. Finally, the multiple level signaling technique is also described for use in a hybrid environment with an existing non-return-to-zero (NRZ) data transfer scheme in one embodiment. However, other embodiments may use the multiple level signaling technique with other data transfer schemes, other than NRZ, when implementing the multiple level signaling in a hybrid operation.

Figure 1:
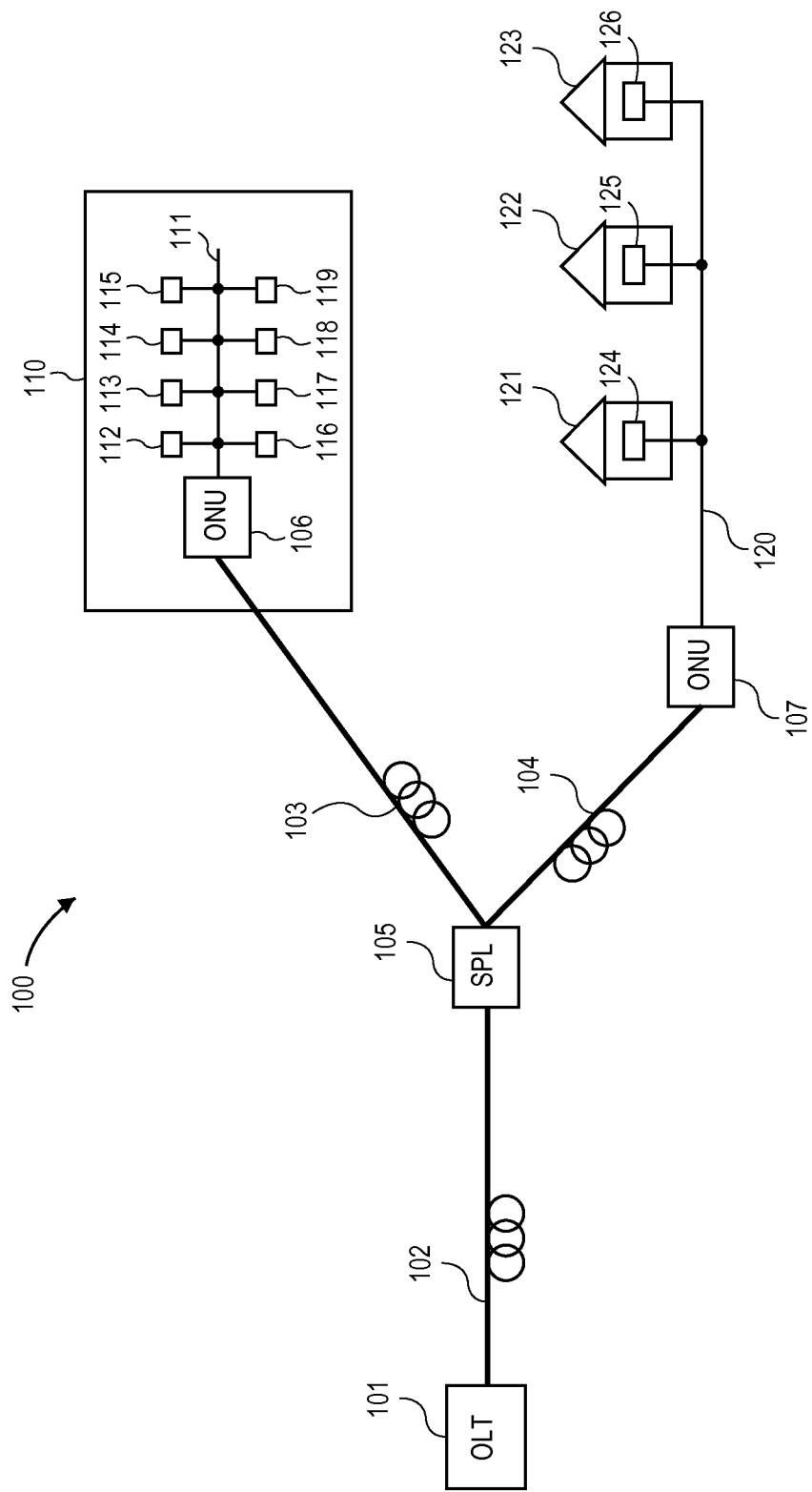
FIG. 1 shows a system diagram of an example Passive Optical Network that employs multi-level signaling to connect to various end users according to one example embodiment.

Referring to FIG. 1, it shows a system diagram of an example Passive Optical Network (PON) that employs multi-level signaling to connect to various end users according to one example embodiment. Example system 100 shows a head end or upstream unit, designated as Optical Line Terminal (OLT) 101, coupled to a plurality of downstream or tail end units, designated as Optical Network Unit (ONU). Only two ONUs 106 and 107 are shown for system 100, but it is understood that any number of ONUs may be coupled to system 100. In a typical operation, OLT 101 functions as a service provider to a plurality of subscribers or end users coupled to the ONUs.

The PON connection is provided by an optical link from OLT 101 to the respective ONUs, such as ONUs 106, 107. An optical link 102 couples OLT 101 to a splitter (SPL) 105, at which node the transmission link is split, so that optical link 103 couples splitter 105 to ONU 106 and optical link 104 couples splitter 105 to ONU 107. Splitter 105 is a passive component that functions to split light emitted from OLT 101 on link 102 to a number of emanating links directed to the ONUs. In the particular example, the split is to links 103 and 104. Thus, light sourced from OLT 101 is split by splitter 105 for transfer to ONU 106 and ONU 107.

Alternatively, light transmissions emanating from the ONUs are routed at splitter 105 and transferred to OLT 101, when the transmission mode is from the ONUs. Thus, as will be further described below, light transmitted from ONU 106 is transmitted to OLT 101 via links 103, 102 and light transmitted from ONU 107 is transmitted to OLT 101 via links 104, 102. In some instances, depending on the signal performance, the light transmissions from ONUs 106, 107 maybe combined at splitter 105 and forwarded to OLT 101.

A variety of optical materials may be used to provide the various links between OLT 101 and the ONUs. In a typical configuration, optical fibers are utilized as the optical transmission medium for the transmission of light. Thus, optical links 102, 103, 104 may use optical fibers. However, other PON systems may use other optical transmission mediums.

Likewise, a variety of light sources may be used at OLT 101, as well as at ONUs 106, 107, to generate the light for transferring data. Laser emission is generally used, due to the coherent nature of light emissions. However, other light sources, such as LEDs (Light Emitting Diodes), may be used in other instances. Whatever sources are used for the light, the light emission is of sufficient power to travel the distance of the fiber link from one end to the other end and capable of being decoded at the terminating end to recover the transmitted information.

For system 100, ONU 106 is shown disposed within building 110. A link 111 is employed to couple ONU 106 to various devices 112-119. In this example, ONU 106 functions as the terminating point for optical link 103 and converts the optical signal from OLT 101 into whatever signal format used for distributing the received signal within building 110. As an example, link 111 may be a wired network distributing the received signal to various end devices 112-119, which may be routers, servers, workstations, computers, media players, televisions or any other device that may store, process or consume the received information. A wireless link may also be used in place of a wired link 111. What is to be noted is that ONU 106 operates as a terminating point for the light signal from OLT 101 and converts the received light into a signal format for distribution within or proximal to building 110.

Alternatively, ONU 107 is shown as a terminating device proximal to a number of residences 121-123. As an example, ONU 107 may be disposed within a neighborhood to distribute signals to a number of residences. In a neighborhood setting, optical link 104 may run to a curb-side and terminated at ONU 107, which may function as a curb-side termination device to convert the light signal to other signal format(s). In the example, a wired line connection, such as cable 120, is distributed to a number of residences 121-123 that have respective end devices 124-126. Only one end device per residence is shown, but in many instances, a residence may have multiple devices coupled to cable (or wired lines) 120. Again, a variety of devices may couple to cable 120, including routers, servers, workstations, computers, media players, televisions or any other device that may store, process or consume the received information. Again, what is to be noted is that ONU 107 operates as a terminating point for the light signal from OLT 101 and converts the received light into a signal format for distribution within or proximal to residences 121-123.

Furthermore, it is to be noted that the shown system 100 is just one example and that other systems may employ various downstream structures than the one shown. Additionally, for system 100, if an optical connection is desired to end devices 112-119, ONU 106 may be replaced with a splitter and wired link 111 replaced by an optical link. Then, an ONU may be placed at devices 112-119, so that light transmission from OLT 101 is extended all the way to devices 112-119. Likewise, if an optical connection is desired to end devices 124-126, ONU 107 may be replaced with a splitter and cable 120 replaced by an optical link. Then, an ONU may be placed at devices 124-126, so that light transmission from OLT 101 is extended all the way to devices 124-126. A variety of different scenarios may be implemented to distribute the multiple level signaling scheme described below.

Figure 2:
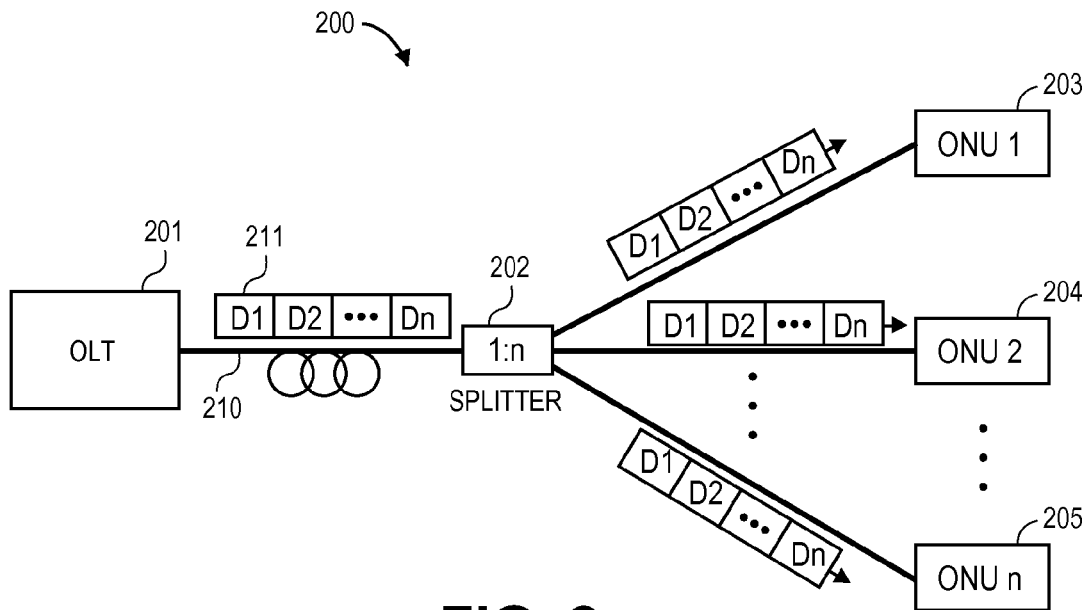
FIG. 2 shows a system diagram for data transfer via an example Passive Optical Network that employs multi-level signaling to transmit the data downstream from a source provider to a plurality of end users connected to the Passive Optical Network according to one example embodiment.

FIG. 2 shows a system diagram for data transfer via an example PON that employs multiple level (also referred to as multi-level) signaling to transmit the data downstream from a source provider to a plurality of end users connected to the Passive Optical Network according to one example embodiment. Example system 200 shows an OLT 201 coupled to a plurality of ONUs, 203-205 via a PON 210 that uses splitter 202 to split the light transmission for distribution to ONUs 203-205.

In one embodiment, OLT 201 transmits an optical signal containing data 211 destined to ONUs 203-205. Data 211 may take various forms, including packet data, frame of data or just series of bits. Data 211 is shown having data elements D1, D2 . . . Dn. When OLT 201 is a head end entity, such as a provider, same data 211 is transmitted to the ONUs coupled to PON 210, via the signal split at splitter 202. Note that splitter 202 is designated as a 1:n splitter, so that data 211 is split at splitter 202 for transmission to ONUs 203-205.

The ONUs 203-205 receive data 211 and respective ONUs extricates those elements of data 211 that are applicable. In one embodiment, data element D1 is designated to ONU1, data element D2 is designated to ONU2, etc. As an example, data element D1 may be an email message destined for a user at ONU1, data element D2 may be an email message destined for a user at ONU2 and etc. In another embodiment, one or more of the data elements may be processed by a plurality of ONUs. For example, if the transmission is carrying television programming, the data elements may correspond to television channels, so that whatever channels are allotted to a particular ONU, that ONU may recover those data elements. It is noted that other examples abound and various embodiments of system 200 may be implemented. What is to be noted is that data 211 is transmitted from OLT 201 in an optical signal and the same data is routed to active ONUs 203-205 after being split at splitter 202.

System 200 may be implemented to carry optical signals employing one of a variety of data transfer protocol. For example, protocols compatible with IEEE 802.3ah specification may be employed for optical transmission of data 211. The IEEE 802.3 based protocols are commonly referred to as Ethernet protocols and IEEE 802.3ah is commonly referred to as Gigabit Ethernet. Utilizing such Ethernet protocols, system 200 may employ known optical signaling schemes, such as the NRZ technique, to identify a bit state for transferring serial data. As noted above, the NRZ technique provides for a two-state (0 or 1) serial transmission in which the state change of a bit is detected with the state change of the signal at the receiving end. However, system 200 implements a multiple level signaling technique described further below, in which states of more than one bit are transmitted per unit time. That is, system 200 uses the multiple level signaling technique to serially transfer more than one bit at a time. System 200 may use the multiple level signaling technique alone or system 200 may implement the multiple level signaling technique in conjunction with the NRZ technique in a hybrid scheme, as further described below. Furthermore, it is to be noted that system 200 may be implemented within system 100 of FIG. 1.

Figure 3:
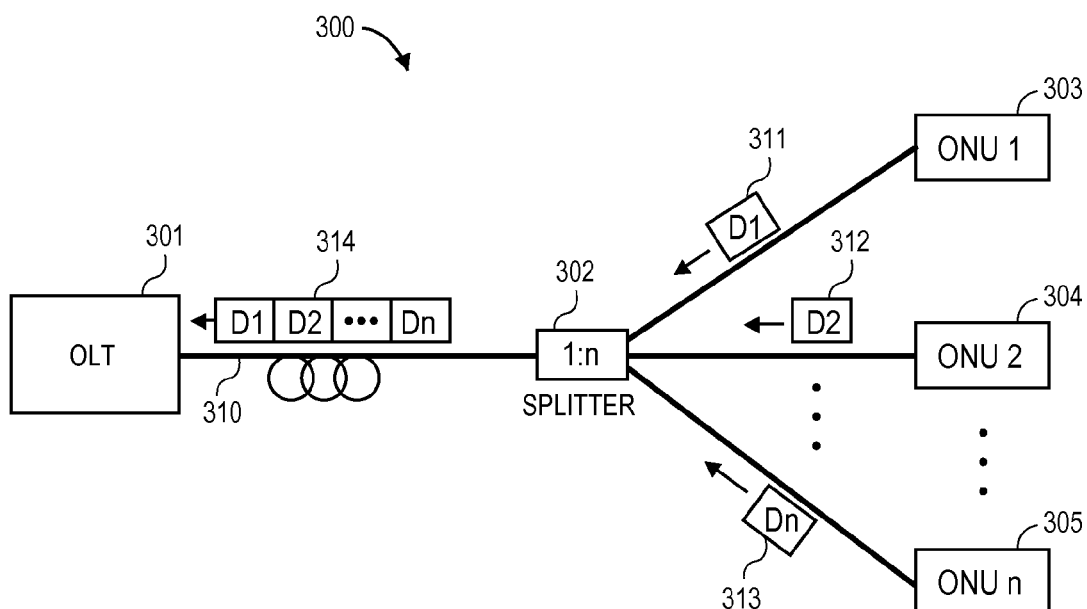
FIG. 3 shows a system diagram for data transfer via an example Passive Optical Network that employs multi-level signaling to transmit data upstream from a plurality of users connected to the Passive Optical Network according to one example embodiment.

FIG. 3 shows a system diagram for data transfer via an example PON that employs multi-level signaling to transmit data upstream from a plurality of users connected to the Passive Optical Network according to one example embodiment. FIG. 3 shows a system 300 that is equivalent to system 200 of FIG. 2. In this example system 300 data flow is sent upstream from ONUs 303-305 to OLT 301 via PON 310. PON 310 is equivalent to PON 210, in that 1:n splitter 302 provides the split of the optical transmission. In this instance, respective data 311-313 from ONUs 303-305 are optically transmitted to OLT 301 as upstream data. Individual data elements are shown as D1, D2 Dn from the ONUs. The different data 311-313 are timed to be sent at different times so that when arriving at splitter 302, individual data 311-313 are combined to form data frame or string 314 without collisions between the data. A variety of techniques may be used to provide the collision avoidance of upstream data. For example, time division multiple access (TDMA) scheme may be used to time the transmission of data 311-313 from ONUs 303-305. In one embodiment, burst mode transmission may be used to burst data at various times for upstream data flow. System 300 may be implemented within system 100 of FIG. 1.

In a typical operation, such as for system 100, the upstream OLT would send data downstream to ONUs coupled to a PON based on the technique described for system 200. The downstream data is sent to the active ONUs coupled to the PON. A particular ONU then recovers that portion of the downstream data that is destined for that particular ONU. For upstream data flow, the OLT controls the timing of the burst communication from the respective ONUs, so that under this timing arbitration, those ONUs sending data may do so within the allotted time slot, so that when the data from the sending ONUs are combined at the splitter, collisions are avoided. This data combining is based on the fact that the ONUs utilize the same light wavelength (defined as color). If ONUs use different colors for upstream data flow, then the difference in the color assures collision avoidance of upstream data.

In the downstream data flow, an embodiment of the multi-level signaling technique is used to transmit the downstream data. As noted above, a hybrid technique may be used as well. In the upstream data flow, the ONUs may or may not utilize the multi-level signaling. As will be described, multi-level signaling provides for high data throughput on the optical links. Generally, since more data flows downstream from the head end provider, higher data rates are used for this downstream data flow. The multi-level signaling may be used for upstream data flow, but because tail end users typically do not require high data throughput, a simpler scheme such as NRZ may be adequate for the upstream data flow.

It is to be noted that systems 100, 200 and/or 300 (of FIGS. 1-3) may utilize a PON that is compatible with a variety of standards or protocols. For example, a PON may be compatible with one of the IEEE (Institute of Electrical and Electronic Engineers) specifications, such as Ethernet PON (EPON) based on IEEE 802.3. Various versions include IEEE 802.3ah, IEEE 802.3ae, IEEE 802.3av, IEEE 802.3-2012, etc. A PON may be based on one of the ITU (International Telecommunication Union) specifications, such as an Asynchronous Transfer Mode PON (APON), Broadband PON (BPON), Gigabit PON (GPON). A PON may also be regarded as a Wave Division Multiplexing PON (WDM PON), in which multiple number of optical carrier signals are transmitted on a single optical fiber by use of different wavelengths of light (e.g. colors). Similarly, other types of PONs may be used as well.

Figure 4:
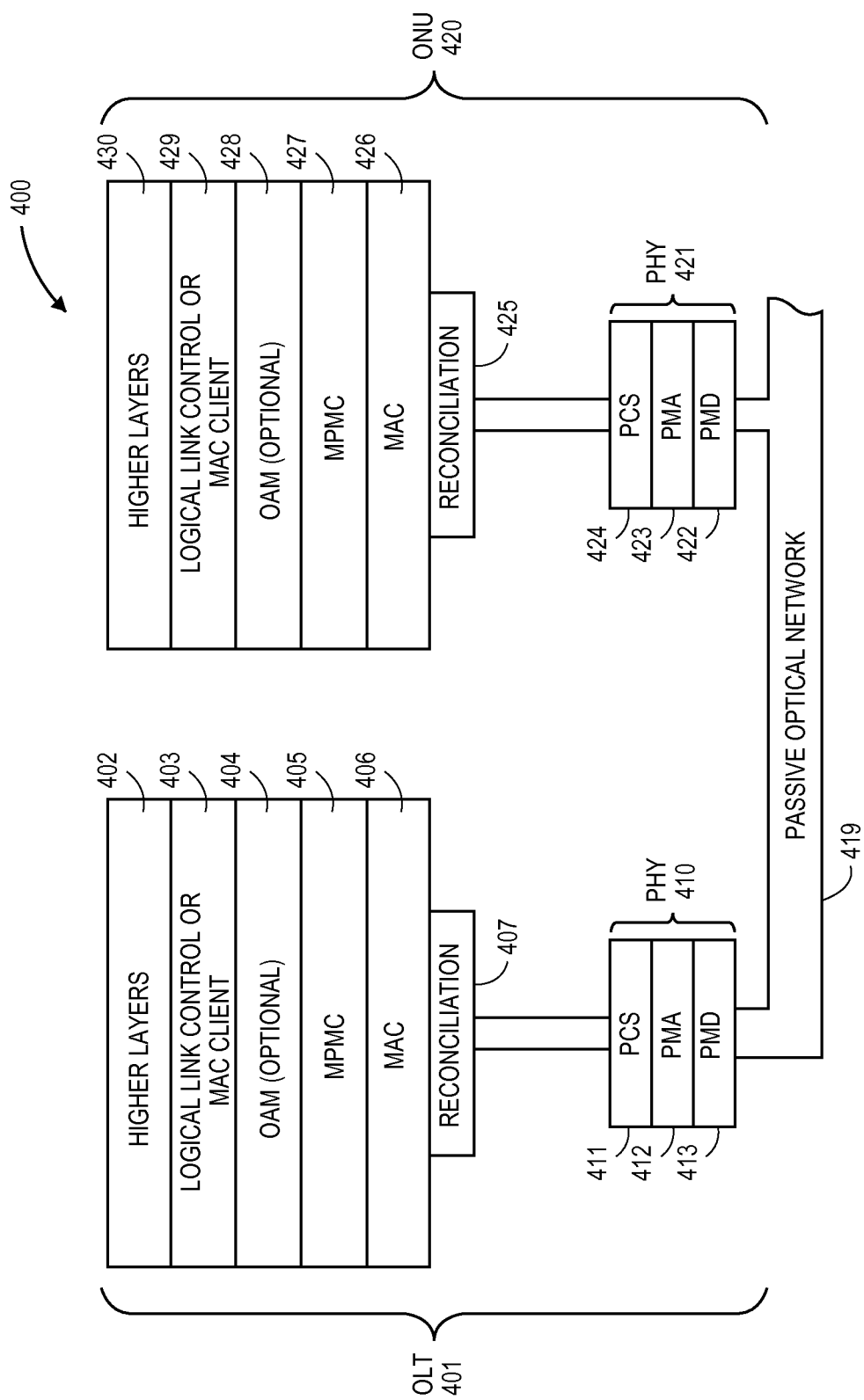
FIG. 4 is an example block diagram showing various layers at both the upstream end (Optical Line Terminal) and downstream end (Optical Network Unit) of a Passive Optical Network according to one example embodiment.

FIG. 4 is an example block diagram showing various layers at both the upstream end (OLT) and downstream end (ONU) of a PON according to one example embodiment. A system 400 is shown having an OLT 401 and an ONU 420 coupled via PON 419. System 400 may be implemented as one of the afore-mentioned systems 100, 200, 300. The diagram of FIG. 4 illustrates the lower layers of an open systems interconnection (OSI) model for a communication system. The physical link layer (PHY) 410 includes Physical Medium Dependent sublayer (PMD) 413, Physical Medium Attachment sublayer (PMA) 412 and Physical Coding sublayer (PCS) 411 for OLT 401 and PMD 422, PMA 423 and PCS 424 for ONU 420. In some instances where a Reconciliation sublayer 407 and/or 425 is used, the Reconciliation layer may be part of the PHY.

The Data Link layer of the OSI model includes Logical Link Control (LLC) or other MAC Client sublayer 403, MultiPoint MAC Control sublayer 405 and Media Access Control (MAC) sublayer 406 for OLT 401 and Logical Link Control or other MAC Client sublayer 429, MultiPoint MAC Control sublayer 427 and MAC sublayer 426 for ONU 420. In some instances, an optional Operations, Administration and Maintenance (OAM) sublayer 404 and/or 428 may be present. Above respective Data Link layers are the higher layers 402 for OLT 401 and higher layers 430 for ONU 420.

Generally, the multi-level signaling technique for a PON may use the various sublayers of the OSI model. The PHY 410 is the layer that is responsible for the signaling of the data from the MAC sublayer onto the optical medium, which is PON 419 in FIG. 4. For outgoing data, the PCS provides the coding and sends to the PMA, which translates the coded data into bits that the PMD may use to couple to the PON. For incoming data from PON, the process is performed in the reverse order. Therefore, the coding and the signal processing for receiving and/or transmitting by OLT 401 and ONU 420 are generally performed in PHYs 410, 421. It is to be noted that system 400 is but one embodiment for implementing the various layers and sublayers used with the multi-level signaling scheme described below.

As noted above, an NRZ technique, as well as the RZ technique, only provides a single level of bit transfer over an optical link. Thus, a light transmission from an OLT using the NRZ technique transmits a "0" bit state or a "1" bit state for data transfer at any given point in time. Thus, one bit state (0 or 1) may be transferred per unit time. It is possible to utilize different channels, such as using a different wavelength (light color) to transmit more data. However, this requires a second light source. The multi-level signaling scheme as described in the embodiments below permit more than one bit of data to be transferred per unit time utilizing a single color.

FIG. 5 is an example signal level diagram 500 for a multi-level light transmission having four signal levels according to one example embodiment. Diagram 500 shows four possible signal levels 510-513 which the signal may take. The signal levels are indicative of signal states. A signal, shown as line 501, exemplifies a transition through the four signal states. Since there are four signal levels 510-513, which correspond to four signal states, two bits of information (00, 01, 10 and 11) may be transmitted at any given time. Thus, as an example, signal level 510 may represent bit state "00", signal level 511 may represent bit state "01", signal level 512 may represent bit state "10" and signal level 513 may represent bit state "11".

The boundaries between the different signal levels 510-513 are represented by threshold levels 502-504. These threshold levels provide the boundary demarcation between the signal levels. In some instances, the threshold levels 502-504 are set at a selected value. In other instances, the threshold levels may have a range around a set value, so as to ensure a band of separation between the signal levels 510-513.

The various threshold levels and, hence the signal states, may be established in a variety of ways. In one embodiment, an amplitude of the light signal is used to provide the signal demarcation. In one embodiment, power level (dB) of the transmitted light is used to establish the different amplitude levels. In other embodiments, other measures, such as voltage or current, may be used to set the different amplitudes. Thus, in reference to FIG. 5, an OLT determines the overall power (assuming power is the measure to be used) that is to be generated for the light source and sets the threshold levels 502-504 at various power levels to establish the multiple signal levels 510-513.

When utilizing the four-level scheme shown in FIG. 5, the data may be processed so that two bits at a time may be transmitted by a light source. The PHY layer will take two bits and modulate the light source based on the state of the bits. In an example embodiment, Pulse Amplitude Modulation (PAM) technique is used to pulse modulate the amplitude of the light signal based on two-bit inputs. The modulated light is then transmitted via a PON to a receiving ONU, in which the receiving ONU may then look at the amplitude level of the signal to determine the signal level for recovering the transmitted two-bit state. Likewise, an ONU may transmit its signal upstream to the OLT using the same multi-level technique, based on the signal levels established by the OLT.

The concept of multiple level signaling may be extended to further number of bits. Thus, FIG. 6 shows an example signal level diagram 600 for a multi-level light transmission having eight signal levels according to one example embodiment. In this instance, eight signal levels 610-617 are established and separated by threshold levels 602-608. A signal, shown as line 601, exemplifies a transition through the eight signal states. Since there are eight signal levels 610-617, which correspond to eight signal states, three bits of information (000, 001, 010, 011, 100, 101, 110 and 111) may be transmitted at any given time. Thus, as an example, signal level 610 may represent bit state "000", signal level 611 may represent bit state "001", signal level 612 may represent bit state "010", signal level 613 may represent bit state "011", signal level 614 may represent bit state "100", signal level 615 may represent bit state "101", signal level 616 may represent bit state "110", signal level 617 may represent bit state "111". In this instance, PAM is used to modulate the transmitted light having 8 levels (PAM8), instead of the PAM4 scheme of FIG. 5.

It is to be noted that the number of modulation levels may be extended further than PAM8 by a factor of $2^N$, where N is an integer greater than 1, to establish 16 levels (four bit grouping), 32 levels (5 bit grouping), 64 levels (6 bit grouping), etc. With each successive iteration, the complexity increases, so that signal detection may become more challenging at the receiving end. However, utilizing the multi-level signaling technique increases the throughput from a single light source.

Referring to FIG. 1 again, the multi-level signaling technique may be implemented in a variety of ways. For example, OLT 101 may desire to transmit data at a certain data transfer rate that may be not be available using an NRZ technique. Therefore, OLT 101 selects a multi-level transmission based on amplitude modulation. OLT 101 may select a PAM level that is commensurate with a data transfer rate that may achieve a selected throughput. OLT 101 then sets itself for a particular modulation level transmission and informs the receiving ONUs 106, 107 as to the signaling levels being transmitted. Once the ONUs are aware of the number of signaling levels and the threshold level values associated with the transmitted signal amplitudes, the ONUs (e.g. ONUs 106, 107) may receive the multi-level optical signal and recover the transmitted signal states.

In utilizing the multiple level signaling technique, OLT 101 and the ONUs may utilize one light source, while increasing the data throughput between the two ends. However, because higher throughput is achievable with the multi-level signaling technique, other embodiments may be employed.

As another example, OLT 101 may utilize the multi-level signaling technique for downstream data flow to the ONUs. However, in return, the ONUs may utilize the NRZ technique, since upstream data throughput is usually much less than the downstream data flow. This scheme allows the OLT to implement the more complex multi-level signaling for transmission, while ONUs need not rely on the multi-level transmission. Of course, the ONUs still need to implement a detector to detect the multi-level transmission from the OLT and recover the transmitted signal states. This scheme of using two distinct transmission modes, such as NRZ and multi-level signaling, would be referred to as a hybrid scheme. Furthermore, in another example embodiment using the hybrid technique, NRZ transmission may utilize a different color than multi-level signaling, so that both may be sent at the same time.

As another example, OLT 101 may use more than one multi-level signaling technique. OLT 101 may use PAM4 transmission and PAM8 transmission together. The lower throughput PAM4 may be intended for ONU 107 for residential distribution, while PAM8 may be intended for ONU 106 for distribution to a business premise. In this instance, OLT 101 uses two color channels (two different wavelengths), one for PAM4 and one for PAM8.

As another example for dual capacity use, a PON may provide 1 Gbit data transfer to residences, while 40 Gbit data transfer is provided to the business premise. In this instance, OLT would use two color channels, one for the 1 Gbit transmission, and the other for the 40 Gbit transmission. It is appreciated that many other examples abound to practice the various embodiments.

Figure 7:
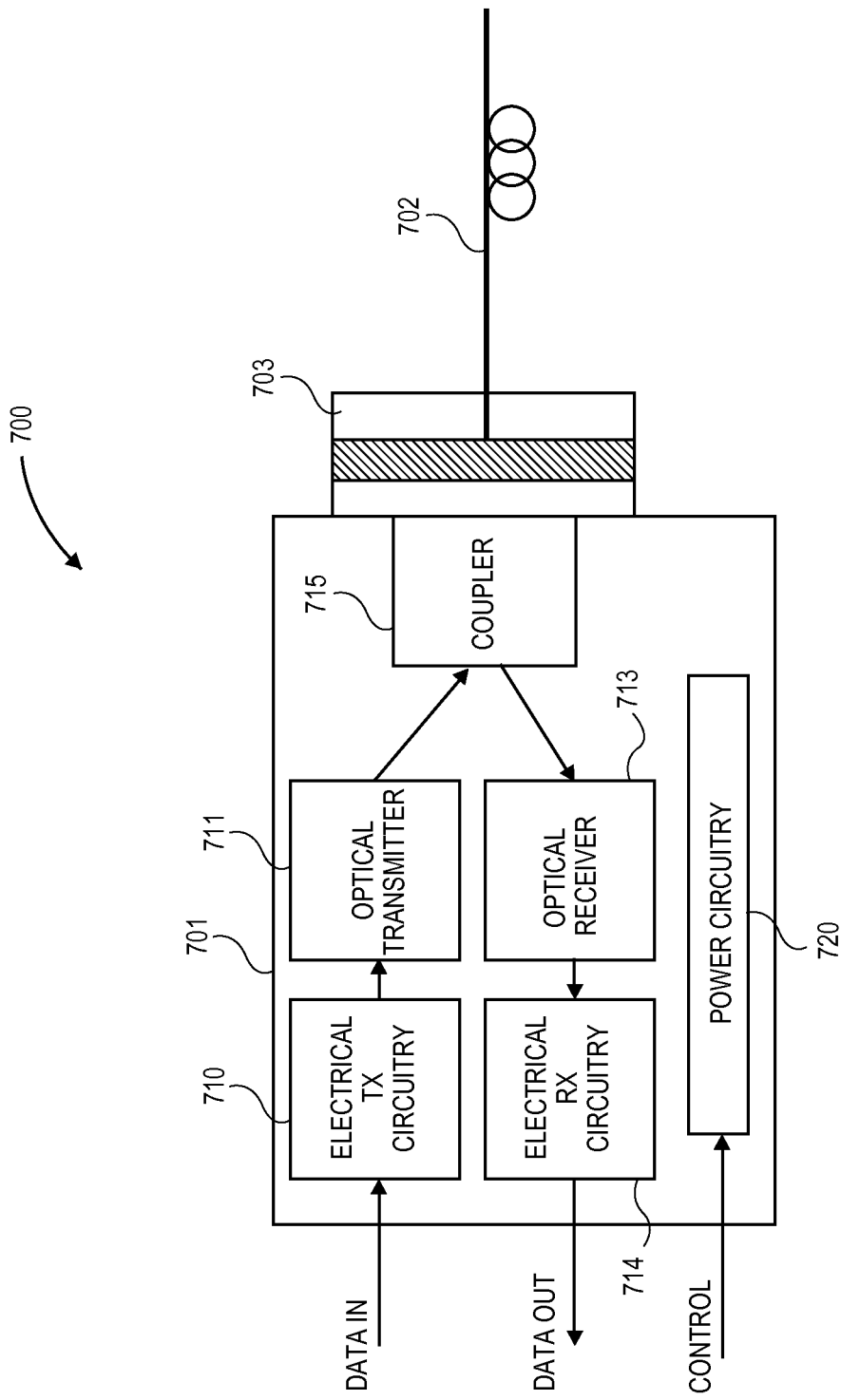
FIG. 7 is an example block diagram showing an optical transceiver that couples to a fiber optical link of a Passive Optical Network for multi-level light transmission according to one example embodiment.

FIG. 7 is an example block diagram showing an optical transceiver that couples to a fiber optical link of a PON for multi-level light transmission according to one example embodiment. FIG. 7 shows an example device 700 that may be employed by PHY layer 410 and/or 421 of FIG. 4. An optical transceiver 701 of device 700 includes a transmitter portion that includes electrical transmit (TX) circuitry 710 and optical transmitter 711. Transceiver 701 also includes a receiver portion that includes optical receiver 713 and electrical receive (RX) circuitry 714. Outbound data is coupled as data in to TX circuitry 710 and inbound data is coupled out of RX circuitry 714 as data out. Transmitter 711 is coupled to coupler 715 for coupling to optical link 702 via interface 703 to transmit the output of transmitter 711 on optical link 702. Receiver 713 is also coupled to coupler 715 to receive incoming signals on optical link 702 via interface 703. Although coupler 715 is shown in the embodiment of FIG. 7, other components, including ferrules, multiplexers, demultiplexers, optical switches, etc. may be readily substituted for coupler 715. Interface 703 is operative to couple optical link 702, which may be an optical fiber, to the device 700. A power circuitry 720 is also present to provide power to transceiver 701 based on a control signal.

In operation, digital data input to electrical TX circuitry 710 is coded to provide an outgoing signal to drive a light source of optical transmitter 711. The coding may encompass the type of communication utilized, such as one of the Ethernet protocols. The modulation is based on the particular multi-level modulation selected. The outgoing signal from TX circuitry 710 drives the light source of optical transmitter and modulates the light source of TX transmitter 711 to send an optical signal on optical link 702, via coupler 715 and interface 703.

When receiving, the incoming optical signal on link 702 and interface 703 is coupled through coupler 715 and sent to optical receiver 713. Optical receiver 713 converts the optical signal to an electronic signal by determining the signal level of the incoming multi-level signal. Once the signal level is detected, the detected signal is sent to RX circuitry 714, which then processes the signal to determine the multi-level signal that was transmitted and outputs respective data as data out in digital format.

The actual signal modulation and detection provided by TX circuitry 710, optical transmitter 711, optical receiver 713 and RX circuitry 714 depends on the mode of operation selected. Thus, transceiver 701 may provide one of the multi-level signaling techniques described or it may provide an NRZ signaling technique. Device 700 may also operate using the hybrid technique by switching between multi-level signaling and NRZ. Likewise, device 700 may also use more than one multi-level signaling (e.g. changing the number of PAM levels), by switching between these modes. Thus, device 700 may be used as an OLT or as an ONU.

Figure 8:
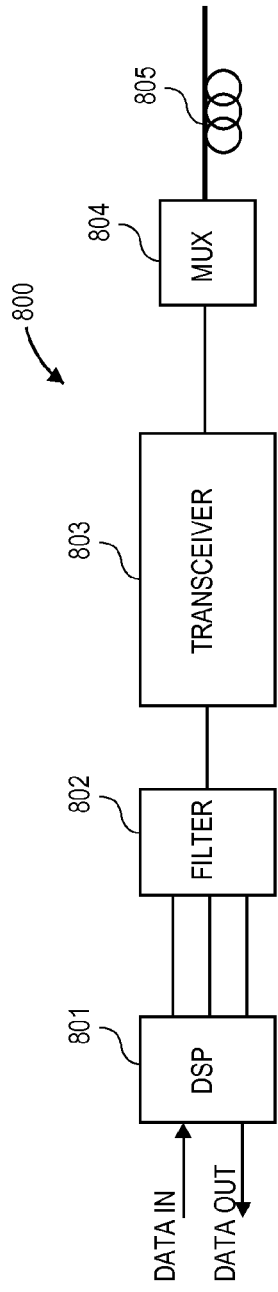
FIG. 8 is an example block diagram of an optical communications circuitry for a termination device that utilizes multi-level signaling, in which one transceiver is used with one light color according to one example embodiment.

Another example embodiment is shown in FIG. 8. FIG. 8 shows an example block diagram of an optical communications circuitry for a termination device that utilizes multi-level signaling, in which one transceiver is used with one light color according to one example embodiment. In this embodiment, device 800 uses a digital signal processor (DSP) 801 to process the incoming data based on the communication protocol and the number of levels selected. In the particular embodiment three sets of signal levels are to be used. For example, PAM4, PAM 8 and PAM16 transmissions are intended for transmission on optical link 805. DSP 801 (or equivalent circuitry) generates outputs, which are filtered by filter 802 to drive a light source present in transceiver 803. Thus, three lines are shown coupled to filter 802 to designate the three multi-level signaling modes, although one line may be used. For this embodiment, the different multilevel signals are used to drive one light source to respectively transmit PAM4, PAM8 and PAM16 signals on link 805 by time division multiplexing to send each signal mode at different times.

Likewise, device 800 may operate in a receiving mode to receive one color on link 805 and process the received color for output from DSP 801 as data out. The receiving operation would also require detection of the mode to switch between the different PAM modes. Accordingly, device 800 may be used as an OLT or as an ONU. It is also to be noted that the NRZ hybrid operation may be readily incorporated into this embodiment as well. It is also to be noted that the example illustrates three different signaling modes, however, other embodiments may have more than three or less than three. A multiplexer (MUX) 804 is shown, but again a variety of devices may be used for coupling of outgoing and incoming signals to optical link 805.

Figure 9:
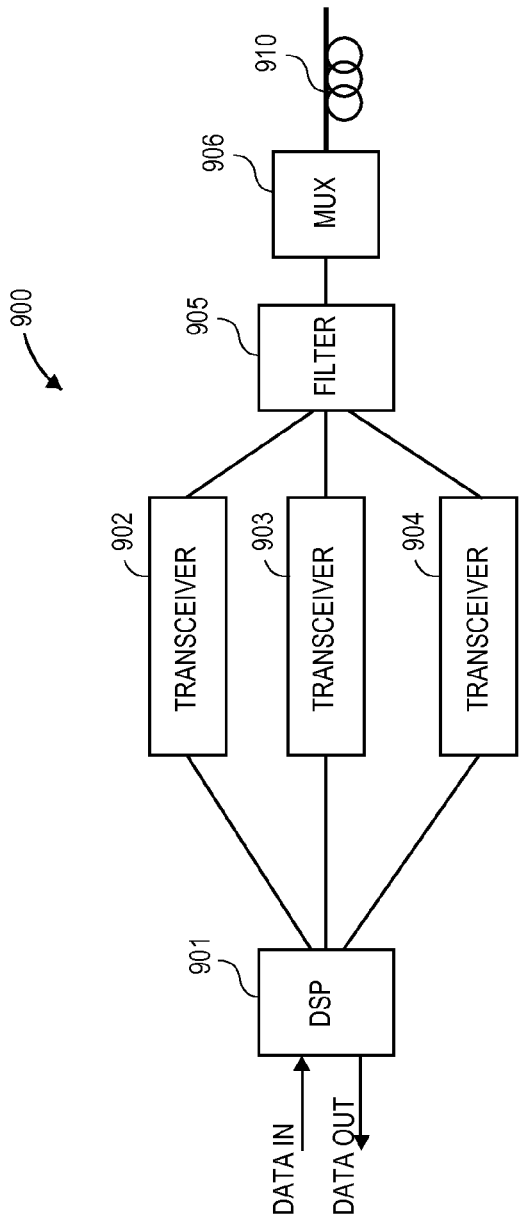
FIG. 9 is an example block diagram of an optical communications circuitry for a termination device that utilizes multi-level signaling, in which multiple transceivers are used for multiple colors, in which a particular transceiver is used for a respective light color according to one example embodiment.

Another example embodiment is shown in FIG. 9. FIG. 9 is an example block diagram of an optical communications circuitry for a termination device that utilizes multi-level signaling, in which multiple transceivers are used for multiple colors, in which a particular transceiver is used for a respective light color according to one example embodiment.

In this embodiment, device 900 uses a DSP 901 to process the incoming data based on the communication protocol and the number of levels selected. In the particular embodiment three sets of signal levels are to be used. For example, PAM4, PAM 8 and PAM16 transmissions are intended for transmission on optical link 910. DSP 901 generates outputs to drive light sources present in transceivers 902-904. For this embodiment, the different multilevel signals are used to drive three different light sources to respectively transmit PAM4, PAM8 and PAM16 signals on link 910. Thus, three colors with each color having a different number of signal levels may be transmitted. Because three different colors are used, the signals may be transmitted together. A filter is used in filtering the outputs from transceivers 902-904. In some instance, filter 905 may not be present.

Likewise, device 900 may operate in a receiving mode to receive three colors on link 910 and filter the different colors to respective transceivers 902-904. In the receive mode, the individual transceivers process the correspondingly received colors for output from DSP 901 as data out. Therefore, device 900 may be used as an OLT or as an ONU. It is also to be noted that the NRZ hybrid operation may be readily incorporated into this embodiment as well. It is to be noted that the example illustrates three different signaling modes and three colors, however, other embodiments may have more than three or less than three. A MUX 906 is shown, but again a variety of devices may be used for coupling of outgoing and incoming signals to optical link 910. Note that devices 800 and/or 900 may employ WDM when employing different colors.

It is to be noted that DSPs are shown in FIGS. 8 and 9, but other embodiments may employ other processing circuitry, processing components and/or processing devices. With such processing capabilities, software programs may be used to provide or aid in the signal processing. Likewise, other circuitry, such as circuitry 710, 714 of FIG. 7 may provide signal processing as well.

Figure 10:
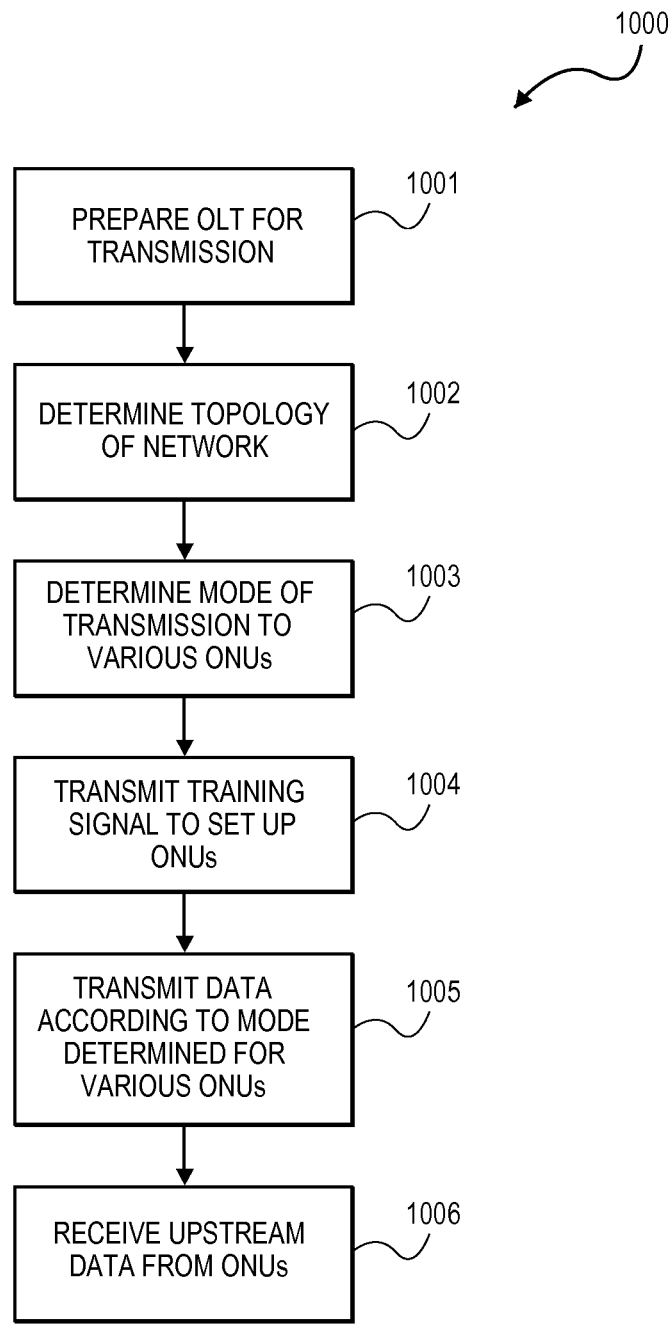
FIG. 10 is a flow diagram illustrating an example method for an upstream unit, such as an Optical Line Terminal, to diagnose a Passive Optical Network and train a downstream unit, such as an Optical Network Unit, to receive a multi-level signaling according to one example embodiment.

When OLT-ONU communication is capable of operating in more than one signaling mode, some mechanism would be used to convey information between OLT and ONUs as to which signaling mode is being used. FIG. 10 shows a flow diagram illustrating an example method for an upstream unit, such as an OLT, to diagnose a PON and train a downstream unit, such as an ONU, to receive a multi-level signaling according to one example embodiment. As shown in method or routine 1000 initiated by an OLT, an OLT prepares a transmission based on a particular signaling level for a color (block 1001). Then, the OLT runs a diagnostic to determine the architecture of the PON (block 1002). The diagnostic performs an operation to do one or more of: mapping the PON architecture, determining how many splitters are used, the structure of the links, how many active ONUs are present on the PON, what modes of multi-level signaling individual ONUs are capable of receiving and transmitting, determining security and access provisions of the individual ONUs, and power levels needed for communication on PON. Essentially, the topology of the PON and components connected on the PON are determined.

Once the topology is known, one or more modes of transmissions are determined for the active ONUs connected to the PON, including setting of signal levels and threshold levels (block 1003). Subsequently, training signals are sent from the OLT to train various ONUs as to which multi-level signaling technique to use, or alternatively any other mode such as NRZ (block 1004).

As to the training signals, a variety of different training signals or schemes may be employed. For example, training may occur once for all or a set of ONUs periodically on an established cycle or super-cycle (more than one cycle). Alternatively, training may be done cycle to cycle. Other schemes may be implemented as well.

Then, the data may be transmitted corresponding to the transmission mode selected for the ONUs (block 1005). After transmission, the OLT enters a receiving mode and waits to receive data sent from the ONUs (block 1006). In some instances, where full-duplex is used, both receiving and transmitting may be performed at the same time.

Furthermore, it is to be noted that some form of error correction may be implemented as well. For example, forward error correction (FEC), utilizing correction codes, may be sent with the transmission in order to correct for corruption that may result during transmission. Other error correction techniques may be used as well.

Figure 11:
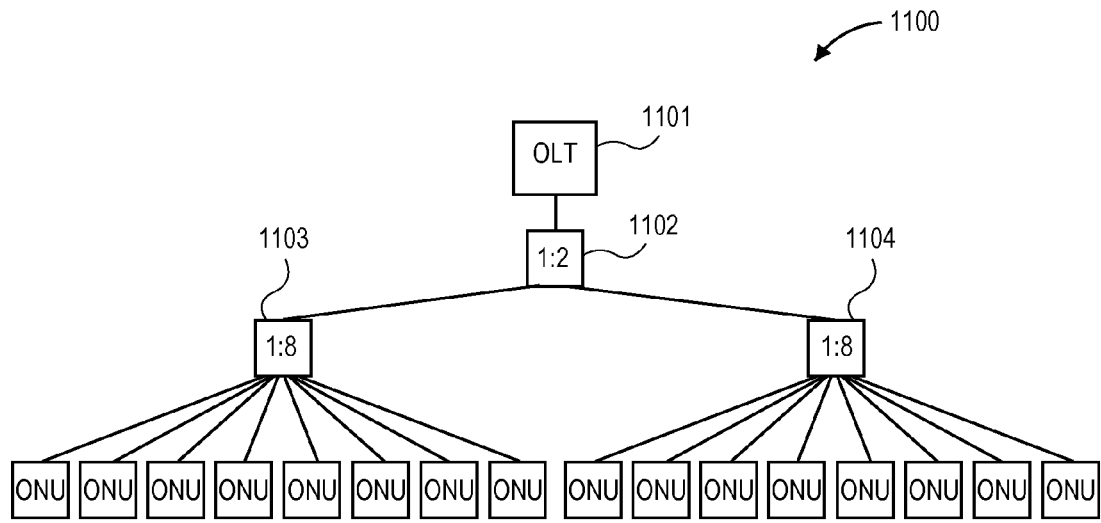
FIG. 11 is a system diagram of an example multi-level signaling, Passive Optical Network in a balanced tree and balanced splitter arrangement according to one example embodiment.

It is to be noted that a PON architecture may take various forms, in which multiple signaling may be used within the PON architecture. Thus, FIG. 11 shows a system diagram of an example multi-level signaling, PON in a balanced tree and balanced splitter arrangement according to one example embodiment. PON structure 1100 is a balanced tree structure, since the structure downstream of OLT 1101 at splitter 1102 is balanced and the structure is also balanced beyond splitters 1103 and 1104.

Figure 12:
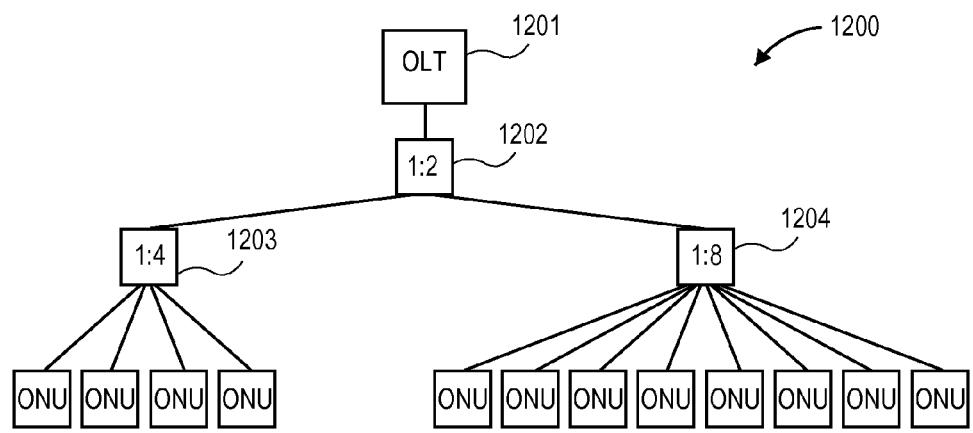
FIG. 12 is a system diagram of an example multi-level signaling, Passive Optical Network in a balanced tree, but having an unbalanced splitter, arrangement according to one example embodiment.

FIG. 12 is a system diagram of an example multi-level signaling, PON in a balanced tree, but having an unbalanced splitter, arrangement according to one example embodiment. In this example PON structure 1200, the split downstream from OLT 1201 at the first splitter 1202 is balanced, but subsequent splitters 1203 and 1204 do not maintain the balance.

Figure 13:
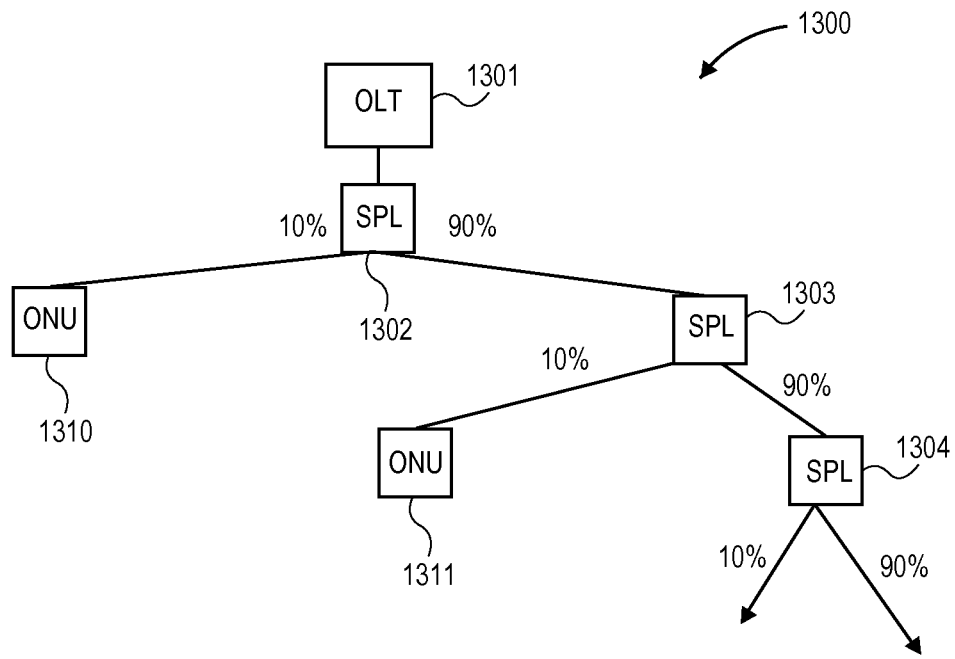
FIG. 13 is a system diagram of an example multi-level signaling, Passive Optical Network in an unbalanced tree and unbalanced splitter arrangement according to one example embodiment.

FIG. 13 is a system diagram of an example multi-level signaling, PON in an unbalanced tree and unbalanced splitter arrangement according to one example embodiment. In this structure 1300, the unbalance commences from the first split downstream of OLT 1301 at splitter 1302, where the unbalance is shown as 10%-90% split. ONU 1310 is coupled on the 10% side and splitter 1303 is coupled on the 90% side. A 10%-90% split occurs again at splitter 1303 when the signal is split to ONU 1311 and splitter 1304. Splitter 1304 also has a 10%-90% split as well. Other embodiments may have other split weights or a combination of split weights.

Figure 14:
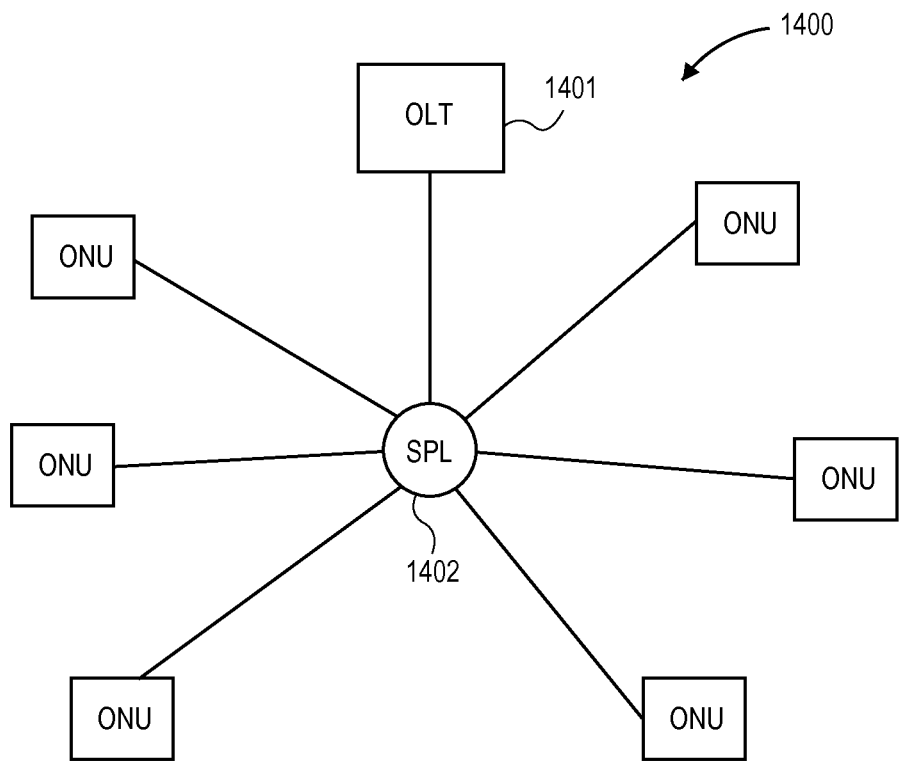
FIG. 14 is a system diagram of an example multi-level signaling, Passive Optical Network in a star arrangement according to one example embodiment.

FIG. 14 is a system diagram of an example multi-level signaling, PON in a star arrangement according to one example embodiment. In this structure 1400, OLT 1401 is coupled to a splitter 1402, which splits out to a plurality of ONUs.

It is to be noted that FIGS. 11-14 are just few examples of PON structures that may exist. The signal distribution and the power requirements to transmit a signal via a particular PON structure may be assessed in determining the power settings needed for establishing the various signal levels that are to be used in the multiple signaling technique described above to adequately transmit signals to the destination device.

Thus, a multiple level signaling for passive optical networks is described. As noted above, a variety of communication protocols or standards may be readily adapted for use on the PONs, including IEEE 802.3, (such as IEEE 802.3ah, IEEE 802.3ae, IEEE 802.3av, IEEE 802.3-2012, Ethernet, etc.) or other PON schemes such as APON, BPON, GPON, WDM-PON, etc. Likewise, various modulation techniques may be implemented to obtain the multiple levels of signaling. The modulation scheme need not be limited to PAM. Furthermore, the multi-level signaling increases throughput for optical networks to exceed 1 Gbit per second and may be implemented for much higher data throughput. For example, optical networks having data transfer rates of 10 Gbits per second, 40 Gbits per second, 100 Gbits per second and 400 Gbits per second may be realized with the multi-level signaling technique. Data transfer rates exceeding Terabits per second are possible. Furthermore, optical networks which may use non-standard rates, such as 2.5 Gbits per second, may use the described multi-level signaling technique. Finally, although the embodiments are described in regards to a PON, other optical networks may readily implement the multi-level signaling.

The embodiments above have been described with the aid of functional building blocks illustrating the performance of certain functions. The boundaries of these functional building blocks have been arbitrarily defined for convenience of description. Alternate boundaries could be defined as long as the certain functions are appropriately performed. One of ordinary skill in the art may also recognize that the functional building blocks, and other illustrative blocks, modules and components herein, may be implemented as illustrated or by discrete components, application specific integrated circuits, processors executing appropriate software and the like or any combination thereof.

As may also be used herein, the terms "controller", "processor", and/or "processing unit or circuit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information.

What is claimed is:

1. An apparatus to transmit optical signals comprising:
first circuitry configured to generate at least a first outgoing signal that is encoded to have multiple signal levels, in which respective signal levels are indicative of different signal states of more than one bit;
second circuitry configured to generate at least a second outgoing signal that is encoded to have multiple signal levels, in which respective signal levels are indicative of different signal states of one or more bits;
a first optical transmitter, configured to operate with the first circuitry, to receive the first outgoing signal and to drive a first light source by modulating the first light source, based on the outgoing signal, to generate a first modulated light signal having the multiple signal levels for optical transmission;
a second optical transmitter, configured to operate with the second circuitry, to receive the second outgoing signal and to drive a second light source by modulating the second light source, based on the outgoing signal, to generate a second modulated light signal having the multiple signal levels for optical transmission together with the first modulated light signal; and
an optical interface configured to operate with the first and second optical transmitters, in which the optical interface is configured to couple the first and second modulated light signals for the optical transmission onto a passive optical network (PON), which has passive splitters to split modulated light, and to transmit the first and second modulated light signals having multiple signal levels to a plurality of destinations via the PON.

2. The apparatus of claim 1, wherein the PON forms an Ethernet compatible network.

3. The apparatus of claim 1, wherein the first circuitry is configured to utilize pulse amplitude modulation (PAM) to generate the first modulated light signal that has more than two signal levels.

4. The apparatus of claim 1, wherein the first circuitry is configured to utilize pulse amplitude modulation (PAM) to generate the first modulated light signal having $2^N$ signal levels, in which N is an integer greater than 1.

5. The apparatus of claim 1, wherein the first circuitry is configured to utilize pulse amplitude modulation (PAM) to generate the first modulated light signal that has more than two signal levels and the second circuitry is configured to utilize pulse amplitude modulation (PAM) to generate a non-return-to-zero (NRZ) signal having two signal states, in which the first and second optical transmitters are configured to operate as a hybrid transmitter to send PAM and NRZ signals to the plurality of destinations via the PON.

6. The apparatus of claim 5, wherein the first and second optical transmitters are configured to transmit the PAM signal utilizing light having a first color and to transmit the NRZ signal having a second color.

7. The apparatus of claim 1, wherein at least one of the first and second circuitry is configured to utilize a diagnostic routine to determine a topology of the PON to map the plurality of destinations, to determine active optical devices at the plurality of destinations and to determine capabilities of the active optical devices in receiving the multiple signal levels.

8. The apparatus of claim 1, wherein at least one of the first and second circuitry is configured to utilize a training signal to train a receiving device at one of the plurality of destinations of the PON to receive a particular number of signal levels.

9. An apparatus to receive optical signals comprising:
an optical interface configured to couple to a passive optical network (PON), in which the PON has passive splitters to split a plurality of modulated light signals transmitted from a plurality of optical light sources located at a head end of the PON, and to communicate with the plurality of optical light sources via the PON to receive a first of the plurality of modulated light signals having multiple signal levels from the optical light source, wherein respective signal levels correspond to different signal states of more than one bit and to also receive at least a second of the plurality of modulated light signals having multiple signal levels from at least a second one of the plurality of optical light sources, wherein respective signal levels correspond to different signal states of one or more bits;
a first optical receiver configured to receive at least one of the plurality of modulated light signals from the optical interface and to operate on the modulated light to determine the multiple signal levels;
a second optical receiver configured to receive at least a second one of the plurality of modulated light signals from the optical interface and to operate on the modulated light to determine the multiple signal levels; and
circuitry configured to determine the different signal states based on the multiple signal levels to recover the different signal states of multiple level signaling transmitted from the first and second optical light sources.

10. The apparatus of claim 9, wherein the PON forms an Ethernet compatible network.

11. The apparatus of claim 9, wherein the plurality of modulated light signals utilize pulse amplitude modulation (PAM) to designate the different signal states and in which the modulated light has more than two signal levels.

12. The apparatus of claim 9, wherein the plurality of optical light sources transmit the first of the plurality of modulated light signals that utilizes pulse amplitude modulation (PAM) to designate more than two different signal levels and transmits the second of the plurality of modulated light signals that utilizes a non-return-to-zero (NRZ) light signal having two signal states, in which the PON operates as a hybrid transmission medium to send both PAM and NRZ signals together to the apparatus, in which the optical receiver is configured to receive the PAM and NRZ signals and the circuitry is configured to process at least one of the PAM and NRZ signals.

13. The apparatus of claim 12, wherein the PAM signal is transmitted utilizing light having a first color and the NRZ signal is transmitted utilizing light having a second color.

14. The apparatus of claim 9, wherein the circuitry is configured to respond to a diagnostic routine transmitted from at least one of the plurality of optical light sources, in which the diagnostic routine is used to determine a topology of the PON to map the apparatus and to determine capabilities of the apparatus when in an active mode to receive at least one of the plurality of modulated light signals having the multiple signal levels.

15. The apparatus of claim 9, wherein the circuitry is configured to respond to a diagnostic routine transmitted from the at least one of the plurality of optical light sources, in which the diagnostic routine is used to determine a topology of the PON to map the apparatus and to determine a signal level of at least one of the plurality of modulated light signals that is to be transmitted to the apparatus.

16. The apparatus of claim 9, wherein the circuitry is configured to respond to a training signal from the at least one of the plurality of optical light sources for training the circuitry to process a particular number of signal levels.

\* \* \* \* \*